Feb. 6, 1962     H. THEURER     3,019,908
AUTOMOBILE VISOR SUPPORTABLE RACK
Filed May 27, 1959
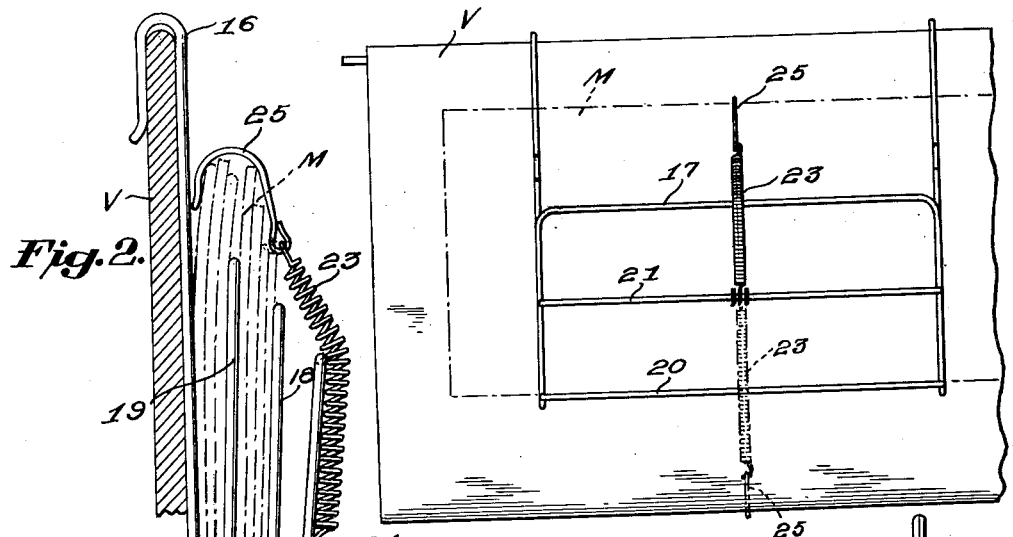
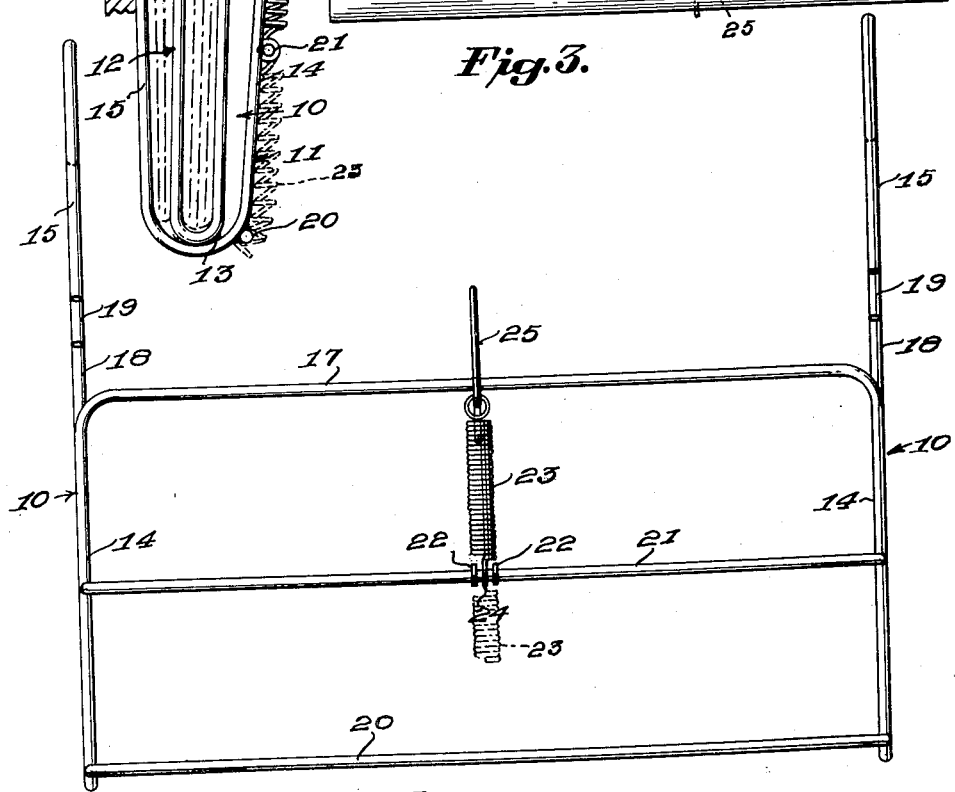
INVENTOR.
Harold Theurer.
BY 

United States Patent Office 3,019,908
Patented Feb. 6, 1962

3,019,908
AUTOMOBILE VISOR SUPPORTABLE RACK
Harold Theurer, 834 S. Phillips Ave., Sioux Falls, S. Dak.
Filed May 27, 1959, Ser. No. 816,278
4 Claims. (Cl. 211—50)

This invention relates to an automobile visor supportable rack.

The invention is more particularly concerned with a rack for supporting maps or the like and which is capable of being removably supported by an automobile visor whereby same is capable of being concealed when not required for use and which may be readily brought to an accessible position for use.

A primary object of the invention is the provision of a rack capable of supporting maps or the like and which is removably supportable on the pivot edge of an automobile visor whereby the rack is capable of being brought into accessible position upon swinging the visor to a vertical light shielding position.

A further object of the invention is the provision of a map supporting rack which is of open wire strand formation thereby providing clear visibility of the maps for identification thereof even when supported in the rack.

A still further object of the invention is the provision of a map supporting rack which is light in weight, simple in construction and which is capable of manufacture at relatively low cost.

Other objects and advantages of the invention will become apparent in the course of the following detailed description, taken in connection with the accompanying drawing, wherein—

FIG. 1 is a front elevational view of the improved rack in accordance with a preferred structural embodiment thereof.

FIG. 2 is an end elevational view of the rack operatively supported on an automobile visor which is shown broken away and in section.

FIG. 3 is a front elevational view of the rack on a reduced scale and wherein same is operatively supported on an automobile visor in an accessible position for use.

Referring now in detail to the drawing, the improved rack will be seen to comprise opposite end members 10, each of which comprises an outer generally U-shaped member 11 and an inner generally U-shaped member 12.

The U-shaped members are formed from lengths of relatively heavy wire and have their legs diverging from the arcuate bights thereof, as shown in FIG. 2.

The arcuate bases or bights of the members 11 and 12 are suitably secured together as at 13.

As is clearly indicated in FIG. 2, the legs 14 and 15 of the outer member 11 are of substantially different lengths, the latter of which is provided with a hook 16 for frictionally engaging the pivoted edge of a visor V.

The legs 14 are unitary with a member 17 which interconnects the two end members 10 and the legs 18 and 19 of the inner member 12 are of different lengths such that the ends of all of the legs are successively of different elevations from the arcuate base portions.

The said legs 14 of the opposite end members 10 are interconnected by a rod 20 which is disposed in parallel with the member 17 and is disposed adjacent the bottom of the rack.

As is indicated in FIGS. 2 and 3, the several legs 14, 15, 18 and 19 provide pockets for maps or the like M whose opposite ends are disposed outwardly of the end members 10 and in order to retain the maps in position, the following means is provided. A rod 21 is disposed intermediate member 17 and rod 20 and in parallel therewith and whose opposite ends are secured to legs 14.

Rigid with the rod 21 are a pair of spaced lugs 22 which are disposed centrally of the rod and a coil spring 23 has one end thereof pivoted on the rod 21 as by means of an eye 24 disposed between the lugs 22.

Secured to the opposite end of the spring is a hook 25 which is adapted to engage over the projecting portions of the maps M, as is indicated in FIG. 2.

As is indicated in dotted lines and particularly in FIG. 3, the spring 23 may be used for holding the rack on the visor V, the hook 25 thereof being engageable over the lower edge of the visor in opposition to the hooks 16 which engage over the upper edge of the visor.

The rack is of heavy wire construction thereby providing for minimum friction between the structural elements thereof and the visor as well as maps retained therein.

From the above description, it will be apparent that a map supporting rack is provided which embodies relatively few simple wire members whereby maps or the like may be supported such that same are readily identifiable without removal thereof from the rack.

It will be further apparent that the rack is of maximum structural simplicity, light in weight and capable of being easily attached to and removed from an automobile sun visor.

Having set forth the invention in accordance with a preferred structural embodiment thereof, what is claimed and desired to be secured by U.S. Letters Patent is:

1. An automobile sun visor engageable rack, comprising a pair of opposite end members each of which comprises a pair of outer and inner generally U-shaped members having arcuate bight portions of different radii and the one of less radius being disposed within the one of greater radius and being rigidly secured thereto, the legs of the U-shaped members being of different lengths and diverging from said arcuate bight portions, the legs of the outer U-shaped members being the longer and the shorter ones, the said longer legs each being provided with a hook engageable with a sun visor, the shorter legs being unitary with a member disposed at right angles to said end members and at a position intermediate said arcuate bight portions and said hooks, a rod disposed in parallel relation to said member and having its opposite ends secured to the outer U-shaped members adjacent the arcuate bight portions thereof, and a second rod disposed between said member and said first rod in parallel relation thereto and having its opposite ends secured to the outer U-shaped members, the spaces between said legs defining pockets for maps or the like.

2. The structure according to claim 1, together with a coil spring having one end thereof engaged with said second rod intermediate the ends thereof and a map engaging hook secured to the opposite end of the spring.

3. The structure according to claim 1, wherein the said elements embodied in said rack are of round wire construction for minimum surface contact between same and said visor and between said legs and maps disposed within said pockets.

4. The structure according to claim 2, wherein said coil spring is swingable about the axis of said second rod for selective engagement of said hook with said map or the lower edge of said visor for the purpose set forth.

References Cited in the file of this patent
UNITED STATES PATENTS

| | | |
|---|---|---|
| 1,736,574 | Binks | Nov. 19, 1929 |
| 2,488,326 | Pratt | Nov. 19, 1949 |
| 2,706,517 | Dexter et al. | Apr. 19, 1955 |
| 2,875,934 | Barg | Mar. 3, 1959 |
| 2,881,926 | Spence | Apr. 14, 1959 |

FOREIGN PATENTS

| | | |
|---|---|---|
| 652,781 | France | Oct. 29, 1928 |
| 1,105,514 | France | June 6, 1955 |